United States Patent [19]

Kawamoto

[11] Patent Number: 4,870,947
[45] Date of Patent: Oct. 3, 1989

[54] RADIANT TUBE BURNER

[75] Inventor: Masao Kawamoto, Yokohama, Japan

[73] Assignee: Nippon Furnace Kogyo Kaisha, Ltd., Yokohama, Japan

[21] Appl. No.: 284,596

[22] Filed: Dec. 15, 1988

Related U.S. Application Data

[62] Division of Ser. No. 195,107, May 16, 1988.

[30] Foreign Application Priority Data

| May 26, 1987 | [JP] | Japan | 62-126989 |
| Sep. 29, 1987 | [JP] | Japan | 62-242715 |
| Apr. 14, 1988 | [JP] | Japan | 63-90365 |

[51] Int. Cl.$^4$ ............................................. F24C 3/00
[52] U.S. Cl. ................................. 126/91 A; 431/284; 431/170; 432/181; 432/209
[58] Field of Search ............................. 126/91 A, 91 R; 431/284, 170; 432/180, 181, 209, 214

[56] References Cited

U.S. PATENT DOCUMENTS

| 2,051,099 | 8/1936 | Munford | 126/91 A |
| 2,148,466 | 2/1939 | Hepburn et al. | 126/91 A |
| 3,079,910 | 3/1963 | Bloom et al. | 126/91 A |
| 4,604,051 | 8/1986 | Davies et al. | 126/91 A |
| 4,800,866 | 1/1989 | Finke | 126/91 A |

Primary Examiner—Carroll B. Dority
Attorney, Agent, or Firm—Notaro & Michalos

[57] ABSTRACT

The present invention relates to a low NOx radiant tube burner. The radiant tube burner consists of; a primary combustion chamber which is located outside of the furnace and having an injection outlet of the combustion gas located approximately more inside of the furnace than the bung of the radiant tube, a primary fuel nozzle which injects primary fuel into the primary combustion chamber, and a secondary fuel nozzle which is surrounded with refractory material and injects secondary fuel into the radiant tube from the area adjacent to the injection outlet. Approximately the total amount of the combustion air is supplied into the primary combustion chamber with primary fuel under a high excess air ratio creating primary combustion. The low concentration of oxygen remaining in the primary combustion gas combined with the secondary fuel creates secondary combustion.

10 Claims, 5 Drawing Sheets

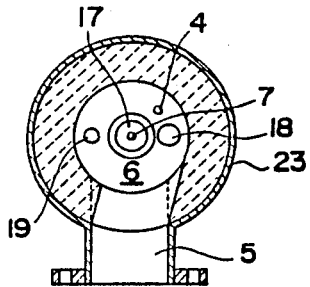
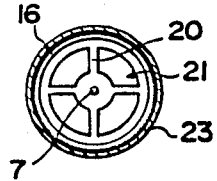
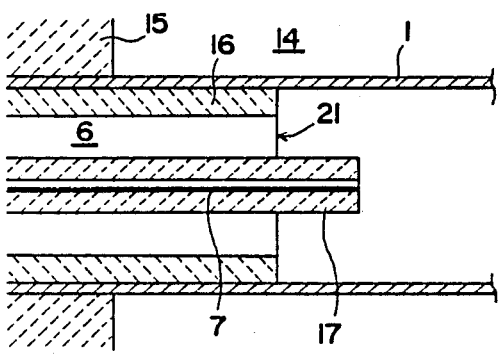

RADIANT TUBE BURNER

This application is a division, of application Ser. No. 195,107, filed May 16, 1988.

FIELD OF THE INVENTION

The present invention relates to a burner, and more particularly to a radiant tube burner.

DESCRIPTION OF THE PRIOR ART

Recently, a preheat technology of combustion air has been developed for increasing thermal efficiency by using large quantities of exhaust gas.

For example, a radiant tube burner is presented in U.S. Pat. No. 4,604,051 where a set of burners equipped with regenerative beds is installed at both ends of a radiant tube, and these burners are operated alternatively to preheat the combustion air using heat accumulated in the non-operated burner side of the regenerative bed. In the burner, as shown in FIG. 10, the conical type regenerative bed 102 is placed inside of the burner shell 104 which surrounds the fuel nozzle 103 protruding into the radiant tube 101 at the outside of the furnace, whereby through the regenerative bed 102 the combustion air is supplied to the combustion chamber and the combustion gas is exhausted. The same FIG. 10 shows the furnace wall 105, the forced draft fan 106, the reversing valve 107, and the ejector 108.

On the other hand, achieving a low NOx burner has been considered to be an important technical issue to prevent air polution. As in the past, a Two Stage Fuel Supply Burner has been considered effective in order to reduce NOx emission in the combustion system. Patents relating to such a techniques include Japanese Pat. Nos. 1,068,772, and 1,104,160, and U.S. Pat. No. 4,505,666. In this type burner, a portion of fuel and all of the combustion air is supplied to a primary combustion chamber, which causes rapid combustion under a high excess air ratio, and also slow and gentle combustion following the heat diffusion is taken place by supplying the remaining fuel (a secondary fuel) to the furnace from the outer edge of the primary combustion chamber and using the low content of residual oxygen in the combustion gas. This two stage fuel supply combustion burner is considered capable of achieving low NOx performance.

The above described regenerative radiant tube burner, however, uses regenerative heat to preheat the combustion air up to about 1,000° C., and therefor has a disadvantage of emitting a large quantity of NOx caused by the extremely high flame temperature. It is disadvantageous to have NOx emissions over 700 ppm as this greatly exceeds the emission limitation allowed (120 ppm) by the Japanese Regulation of the Atomospheric Contamination Prevention Law. In addition, this burner has a structural problem which can result in thermal erosion or rupture of the fuel nozzle 103 which is present in the high temperature combustion gas atmosphere and continuously heated to the point of possible overheating even it is not in operation.

On the other hand, if the well known open flame burner of the two stage fuel supply combustion method is applied into a radiant tube burner, commonly, the combustion is not created by using small amount of fuel until the air is in condition of largely exceeding a reasonable excess air ratio. Because the condition is out of the combustible range. In addition, a reasonable excess air makes the flame short, and therefor, the secondary combustion should be occured adjacent to the primary combustion, meaning that the secondary combustion is forced to be occured outside of the furnace or within the bung. Sometimes it causes to burst out the end portion of the burner or the radiant tube, itself. The above described thermal erosion or a rupture problem caused by overheating is also possible.

Therefore, it is not easy to combine a radiant tube burner using the previous method with the theory of the open flame burner in the two stage fuel supply combustion.

SUMMARY OF THE INVENTION

Primarily, the purpose of this invention is to provide a low NOx radiant tube burner. Secondarily, the purpose of this invention is to provide a long lasting radiant tube burner without danger of thermal erosion or rupturing a fuel nozzle. Thirdly, the purpose of this invention is to provide an appropriate radiant tube burner for a system of receoving heat from an exhaust combustion gas.

To achieve these aims, the radiant tube burner of this invention contains a primary combustion chamber which is placed outside of the furnace and of which the fuel gas injection outlet is located approximately more inside of furnace than the bung of a radiant tube, a primary fuel nozzle which injects a primary fuel into the primary combustion chamber, and a secondary fuel nozzle surrounded by refractory materials which injects a second fuel into the radiant tube from the area adjacent to the injection outlet. All combustion air is led into the primary combustion chamber where combustion takes place. This leads to the secondary combustion in the radiant tube supplied with the secondary fuel and the low concentration of oxygen from the primary combustion gas. Thus, a large amount of the total combustion air injected into the primary combustion chamber is mixed rapidly with a small amount of the primary fuel creating high intensity combustion under a high excess air ratio. This forms a long flame which reaches from the end of the primary combustion chamber outlet inside of the furnace in the radiant tube, and where it reaches the secondary fuel source, a low excess air ratio secondary combustion takes place in the radiant tube. Therefore, providing low flame temperature in the primary combustion zone, and a low excess air ratio for combustion in the secondary combustion zone provides an extremely low total NOx emission. As an advantage, the fuel nozzle is set out from the exhaust gas passage and the secondary fuel nozzle is encompassed with refractory materials to avoid direct encounter with the high temperature combustion gas, thereby protecting thermal erosion or a fuel cracking on the fuel nozzles. Further, in one embodiment of the present invention, the secondary fuel nozzle is placed approximately on the axis of the primary combustion chamber, whereby the second combustion flame is surrounded by the primary combustion gas such that the flame is prevented from directly contacting with inner wall of the radiant tube, thus local overheating in the radiant tube is prevented and therefore the life of the tube is prolonged.

In addition, in this embodiment, it is able to be formed a long flame in the radiant tube by enlarging the flow passage area of the primary combustion gas without changing the diameter of the tube in order to slow the primary combustion gas flow velocity, which causes the mix of the primary combustion gas and the secondary combustion gas to moderate. Therefor it is further contributes to prevention of local over heating in the tube and has uniform thermal distribution even in case of applying an installed radiant tube or in case of without changing the diameter of the tube.

Further, the refractory materials structured in the primary combustion chamber, which is inserted into the radiant tube, protects the bung portion of the radiant tube and also prevents contact with the primary combustion gas. The result prevents rupturing of the radiant tube at the bung.

Further in a preferably embodiment of this invention, the secondary fuel nozzle is protruded from the primary combustion chamber, which generate self-recirculation in the combustion gas, so that NOx emission is more reduced. Further, in another embodiment of this invention, the secondary fuel nozzle is located approximately on the axis of the primary combustion chamber and it injects a secondary combustion fuel both in the axial and in the radial directions of the tube. A secondary combustion is generated by the primary combustion gas and the radially injected fuel; and, furthermore, a third combustion is also generated by the axially injected fuel and the secondary combustion gas. This is so called a three stage combustion system, and is essentially effective in reducing the NOx emissions and provides for an uniform temperature distribution along the radiant tube. According to experimental results, we found the NOx emission is maintained lower than 100 ppm in this construction.

In yet another embodiment of this invention, a recuperator attached to one end of the radiant tube receives the exhaust combustion gas from the tube, and supplies preheated combustion air to the burner which is installed at the other end of the tube.

Further this invention discloses a radiant tube burner which has a set of burners placed at both end of radiant tube, wherein said each burner has a primary combustion chamber which is placed outside of the furnace and of which the combustion gas injection outlet located approximately more inside of the furnace than the bung of the radiant tube; a primary fuel nozzle which injects the primary fuel into the primary combustion chamber and which is located away from the exhaust gas passage; and a secondary fuel nozzle which is surrounded with refractory materials and which injects the secondary fuel into the radiant tube adjacent to the combustion gas injection outlet; and allows to create primary combustion by supplying the primary fuel and almost the total amount of combustion air into the primary combustion chamber and the secondary combustion with the secondary fuel by combining the secondary fuel with low concentrated oxygen remaining in the generated primary combustion gas; and each burner is connected through a regenerative bed selectively either to an air supply system for combustion or to an exhaust combustion gas system, whereby the burners operate alternatively by supplying the combustion air through the regenerative bed or to exhaust the combustion gas through the regenerative bed.

In addition to the low NOx emission, this invention leads to obtaining an uniform temperature distribution along the radiant tube as shown in FIG. 9.

BRIEF DESCRIPTION OF THE DRAWING

FIG. 3 is a cross-sectional view at III—III in FIG. 2.

FIG. 4 is a cross-sectional view at IV—IV in FIG. 2.

FIG. 5 is a cross-sectional view of an alternate embodiment of the present invention.

DETAILED DESCRIPTION

Now, referring to the embodiments represented by the figures, the present invention shall be explained in detail.

Figure 1:
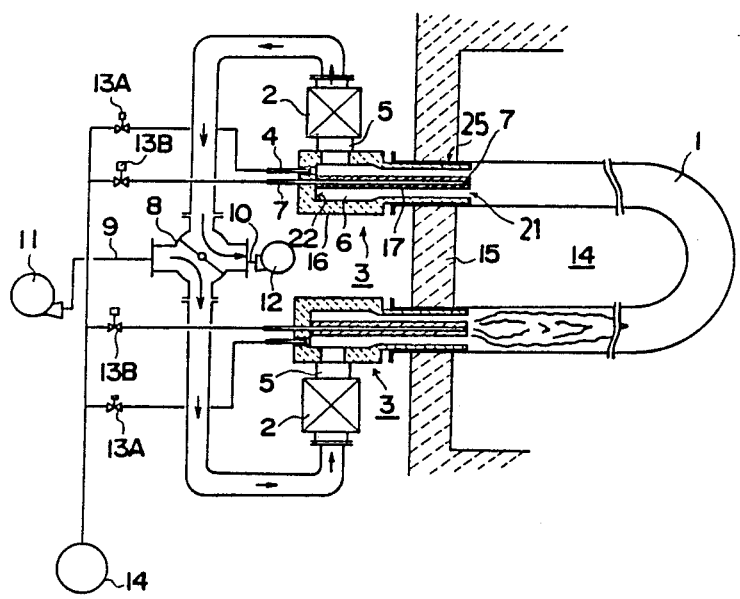
FIG. 1 is a schematic representation of a radiant tube burner in accordance with the present invention.
Figure 2:
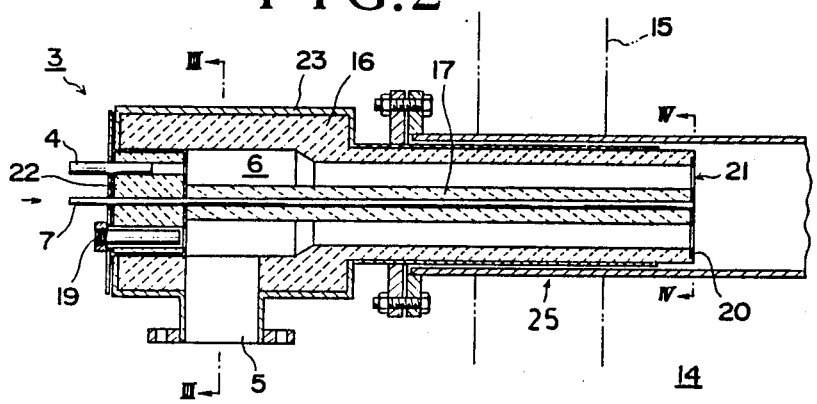
FIG. 2 is a detailed magnification cross-sectional side view of the burner.

FIG. 1 is a schematic illustration of one embodiment of the present invention illustrating a radiant tube burner.

This radiant tube burner contains a pair of burners 3 each of which is connected to one end of a radiant tube 1. Each of these burners is alternately connected to the combustion air supply system 9 and to the combustion gas exhaust system 10 respectively intermediated by regenerative bed 2. Burners are alternatively operated in fire or in flue mode. The combustion exhaust gas is exhausted through the regenerative bed 2 where the associated burner is not being operated. On the other hand the combustion air is supplied through the regenerative bed 2 where the associated burner is being operated. Each of the previously mentioned burners 3 consists of a primary nozzle 4 which injects a portion of the fuel called the primary fuel, a combustion air duct 5 which injects the full amount of combustion air, a primary combustion chamber 6 wherein the primary fuel is burned with the full amount of combustion air under a high excess air ratio, and secondary fuel nozzle 7 which injects the remaining fuel called the secondary fuel directly in to the radiant tube at the outlet of the fired primary combustion chamber or at the combustion gas injection outlet 21.

The combustion air duct 5 is connectd to the regenerative bed 2, so that both the exhaust of combustion gas and the supply of the combustion air is done, through the regenerative bed 2. In the radiant tube 1, the secondary combustion is created by using the remaining allocation of fuel which is injected from secondary fuel nozzle 7 and the residual oxygen in the primary combustion gas which is not consumed on the primary combustion. The fuel ratio supplied to the nozzle in the primary combustion chamber 6 and to the nozzle in the radiant tube 1 is commonly 5 to 50% for primary fuel and 95 to 50% for the secondary fuel. The preferable ratio is 20% for the primary fuel and 80% for the secondary fuel.

The total amount of combustion air is supplied to the primary combustion chamber 6. A small amount of the combustion air, 5 to 10%, could be injected directly into the radiant tube 1 where it is ignited by the secondary fuel so long as the two stage fuel supply combustion concept can accommodate the excess combustion air.

The regenerative bed 2 is alternatively connected to the combustion air supply system 9 and the combustion gas exhaust system 10 through the four direction reversing valve 8. The combustion air is supplied by the forced draft fan 11 of the combustion air supply system 9 through the fired regenerative bed 2 of operated burner 3, and the combustion gas is drafted by the induced fan 12 through the non-fired regenerative bed 2 of the non-operated burner 3. The flow of combustion air and combustion gas is changed by a timer (not shown in the drawing) in specific internals or by measuring the exhaust gas temperature by a thermal detector (not shown in the drawing). If the measured temperature reaches the specific limit or if the set interval is reached, then the reversing value 8 redirects the flow of combustion air and this operation is synchronized with changing the supply of fuel.

The fuel supply source 14 provides fuel through a magnetic solenoid valve 13A which is connected to a primary fuel nozzle 4 and another magnetic solenoid valve 13B which is connected to a secondary fuel nozzle 7. There is a pair of magnetic solenoid valve associated with each of the firing chambers. Just after ignition, it is possible to have a secondary unstable combustion. This is easily controlled by delaying the opening of the magnetic solenoid valve 13B associated with the fired secondary fuel nozzle 7 than the magnetic solenoid valve 13A associated with the fired primary fuel nozzle 4.

The previously mentioned primary fuel nozzle 4 should be located at the back of the primary combustion chamber 6, which is set outside of the furnace 14 so as to be away from the combustion gas exhaust passage and, therefore avoid direct contact to the combustion gas. This particular embodiment has a primary fuel nozzle 4 embedded into the back wall of the insulating firebrick 22 of the primary combustion chamber 6 and having the only outlet of the nozzle is opened to the primary combustion chamber 6. A pilot burner 18 is provided near the primary fuel nozzle 4. The numeral 19 indicates a sight hole.

The secondary fuel nozzle 7 is centered on the central axis of the primary combustion chamber 6 and injects the secondary fuel into the radiant tube at the outlet of the primary combustion chamber 6, i.e., at the combustion gas injection outlet 21. The secondary fuel nozzle 7, in detail description, is located in center of the primary combustion chamber 6 which made of castable refractory 16, protected by refractory insulator 17. On this preferably embodiment, light weight and less expensive glass wool cylinder is applied and held by the secondary fuel nozzle 7. The method is not limited by the above description. For example, the insulator 17 could be made of formed castable refractory or carbon silicate ceramics and inside of it, the secondary fuel nozzle 7 can be embedded; or, the secondary fuel nozzle 7 can be made of refractory materials such as fused quartz or fine ceramics in which case, the extra insulator may not be required.

In the case of this embodiment, the secondary fuel nozzle 7 is held by the back wall portion 22 of the primary combustion chamber 6 at one end and the other end is held at castable refractory 16 by cross shaped suspension frame 20. The back wall portion 22 is separately fabricated to be removable from the main body 16 of the primary combustion chamber 6, wherefore the insulator 17 is able to replace and maintain.

The primary combustion chamber 6 has a cylindrical shape and is usually made of refractory material such as, for example, castable refractory, silicon carbide type ceramics, nitride silicate type ceramics, or sialon ($Si_{6-z}Al_zO_gN_{6-x}$) type ceramics. In this particular embodiment, the primary combustion chamber 6 is structured castable refractory 16. The castable refractory 16 is covered by heat-proof metal member 23 which has a flange to attached to the radiant tube 1. In this particular embodiment, the primary combustion chamber 6, made of castable refractory 16 and covered with heat-proof metal member, has two portions where one portion is called the back wall 22 can be separated from the other portion for easy replacement of the secondary fuel nozzle 7 and the insulator 17.

The injection outlet 21 of the primary combustion chamber 6 is located approximately more inside of the furnace 14 than the bung portion 25 of the radiant tube 1. The "approximately more inside" point should be understood as a point which is at essentially more inside of furnace than the bung portion 25, or at the same surface of the furnace inner wall or even at slightly more concaved inside than the furnace inner wall.

The regenerative bed 2 is to accumulate temporary sensible heat from the combustion exhaust gas and could be made from any materials or by any kind of structural methods as long as the materials/methods neither reacts with the combustion gas nor provides any bad effects to the combustion air. Materials for the regenerative bed 2, in general, need to meet the following requirements; large area for the heat transfer, small pressure loss, resistance to high temperature, resistance to thermal shock, and resistance to corrosion. Thus ceramics, such as alumina, or heat-proof material has been used. As an example, sponge-like-foamed and gas permeable ceramics, called honeycomb ceramics, having many honeycomb shaped holes in the direction of gas flow have been used as the regenerative bed materials.

In this description, a gas permeable, regenerative bed means not only that the material has many holes as a characteristics or in itself, but, also the material can hold permeability within the structure, even if no specific method is set aside for permeability. Therefore, it is possible to make a permeable, solid structure where the combustion exhaust gas temperature is as high as 1,000° C., with heat-proof metal wire, such as FCH-2 made of Fe, Cr, and Al alloy netted as a wire gauze and then piled up in appropriate thickness. This kind of regenerative bed material can be packed in the combustion air duct 5 or be a cartridge type which provides for easy replacement.

The configuration of the radiant tube 1 need not be a certain shape such as straight type, U type, T type, W type, O type, or L type known to be in the Prior Art. It could be a new style.

The radiant tube burner described and structured above is operated as follows:

At first, one of burners 3 is fired with combustion air supplied by the forced draft fan 11. At the same time, high temperature combustion gas in the radiant tube 1 is exhausted through the combustion air duct 5 of the non-operated burner 3 by the pull draft operation of the induced fan 12. The heat from the combustion gas exhausted is recovered while passing through the regenerative bed 2. After defined time interval, the burner which has been operated is allowed to rest, on the other hand, the non-operated burner 3 starts combustion. The combustion gas is exhausted through the regenerative bed 2 associated with burner 3 which has been in the operational or fired mode and now is in the non-operative mode. On the other hand, the combustion air absorbs the heat which has been provided by the exhaust gas and accumulated to the regenerative bed 2 which has been on the non-operated side from the regenerative bed 2 and then is supplied to burner in preheated condition at, for example, 700 to 1,000° C. The temperature of the radiant tube 1 and the regenerative bed 2 is increased gradually by means of changing combustion and exhaust alternatively until the set temperature of both the radiant tube and the regenerative bed is achieved. Then the system of combustion stays in constant operation. The alternative change of combustion air and the combustion gas is done at appropriate time intervals, such as every 20 seconds to 5 minute, or when the temperature of the exhausted combustion gas reaches a set value, such as about 200° C.

FIG. 5 illustrates the other embodiment of the secondary fuel nozzle. Here the secondary fuel nozzle 7 surrounded with the insulator 17 made of light weight refractory materials such as glass wool is protruded from the primary combustion chamber 6 to improve on low NOx performance. If the length of the protrusion is too large, the nozzle 7 tends to bend downward due to the heat. On the other hand, if the length is too small, low NOx performance can not be achieved. Therefore, the protrusion of the secondary fuel nozzle as well as the insulator 17 from the primary combustion chamber is about 50 to 300 mm, and preferably about 200 mm in length. The protrusion type secondary fuel nozzle achieves better low NOx performance compared with the embodiment shown in FIG. 1, since self-recirculation flow of the combustion gas occurs around the secondary nozzle.

Figure 6:
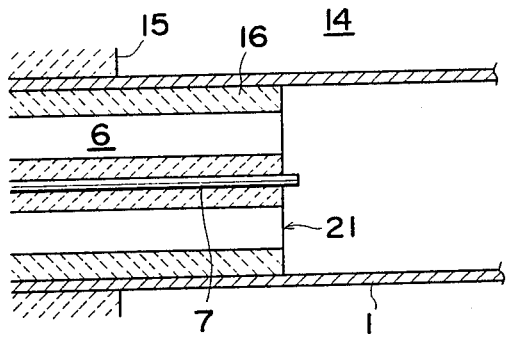
FIG. 6 is a cross-sectional view of other alternate embodiment of the present invention.
Figure 6A:
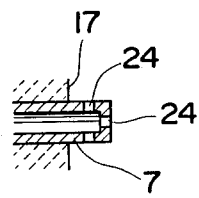

FIG. 6 illustrates characteristics of the secondary fuel nozzle in yet another embodiment of the present invention. In this case, the secondary fuel nozzle 7 is protruded slightly out from the primary combustion chamber 6 into the radiant tube 1 and has one injection outlets 24 at the end in the axial direction and a few injection outlets 24 in radial direction. The fuel injected in the radial direction through the radial outlets 24 creates secondary combustion with a low oxygen concentration (about 17%) of combustion air which remains in the primary combustion gas, and then the fuel injected in the axial direction through the axial outlet 24 creates third combustion with the further low-concentrated oxygen remaining combustion air (about 11%). Thus the three stage fuel supply combustion occurs in this embodiment. Furthermore, there is a case where the amount of the primary fuel becomes nearly zero or sometimes completely zero. Then, the secondary combustion and the third combustion represents, in fact, a two stage, fuel supply combustion. The operable fuel distribution, in this case, is about 5 to 50% for the primary fuel and 95 to 50% for the secondary fuel which includes the fuel for the third combustion. The preferable fuel ratio is about 20% for the primary and 80% for the secondary (considering 40% for the secondary and 60% for the third combustion in the case of the three-stage assuming that the secondary fuel considered as 100%).

Figure 7:
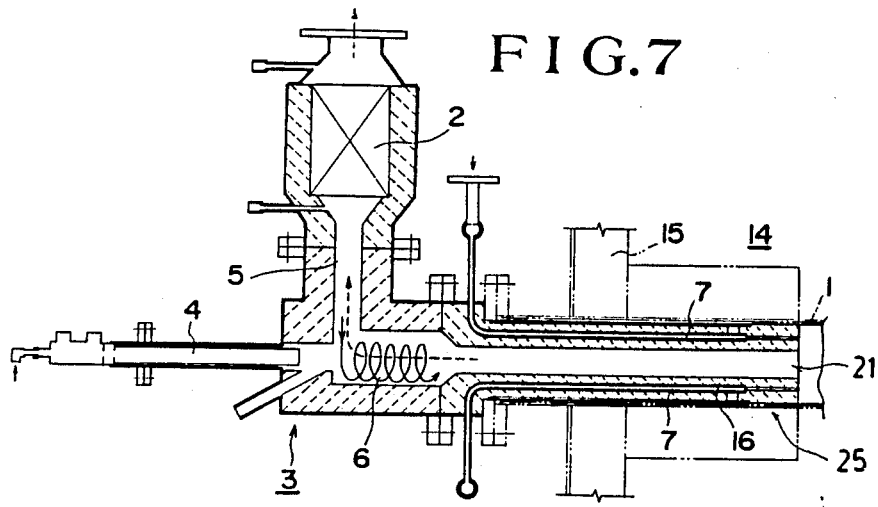
FIG. 7 is a central cross-sectional view of an alternate embodiment of the present invention illustrating a portion of a burner.

FIG. 7 illustrates more another embodiment of this invention. In this embodiment, a burner consists of; a primary fuel nozzle 4 which injects portion of fuel (primary fuel), a combustion air duct 5 which injects a full amount of combustion air to the primary combustion chamber 6 in tangential direction of the cylindrical chamber, the primary combustion chamber 6 wherein the portion of fuel and the full amount of the combustion air are combusted in laminar diffusion combustion under high excess air ratio, and a secondary fuel nozzle 7 which injects remaining fuel (secondary fuel) into the radiant tube 1 circumferencely at the outlet of the primary combustion chamber 6. In the burner, the small amount of fuel is injected to and enveloped in the layer of the rotating combustion air which injected from the combustion air duct 5 into the primary combustion chamber 6, which brings to create a laminar diffusion combustion. As the result, a long flame formed by the combustion reaches radiant tube 1. The secondary combustion occurs in the radiant tube both with the balance of fuel which injected from the secondary fuel nozzle 7 and the oxygen remaining the primary combustion gas. The primary fuel nozzle 4 should be located at the back of the primary combustion chamber 6, which is set outside of the furnace 14 so as to be away from the combustion gas exhaust passage and, therefore avoid direct contact to combustion gas. In this embodiment, the primary fuel nozzle 4 is embedded into the back wall 22 of the primary combustion chamber 6 made of castable refractory and only the tip of the nozzle is opened to the primary combustion chamber 6. In this case the primary combustion fuel nozzle 4 also acts as a pilot burner.

The secondary fuel nozzle 7 is embedded into the primary combustion chamber which constructed of castable refractory 16 and has an injection outlet opening in parallel with the primary combustion gas injection outlet 21 at the end of castable refrctory 16 constructed chamber 6. The secondary fuel nozzle 7 is located further inside of the furnace 14 than the furnace wall 15 and has plural openings, for example four openings, circumferentially to the primary combustion gas injection outlet 21. This configuration provides the best result for low NOx performance and empirical results reached under 100 ppm of the NOx emissions. But, in other hand, if the diameter of the primary combustion chamber 6 becomes smaller, the fuel and the combustion air mixture and diffusion becomes better and the flame tends to become diverged and shorter. Therefore it forms a short, blue flame which is appppropriate for the open flame burner application, but not for this burner. Therefore, it is preferable to possibly enlarge the diameter of the primary combustion chamber 6 until secondary fuel cracking occurs. For example, it is essentially possible to make the diameter of the primary combustion chamber 6 larger along with making the diameter of the radiant tube 1 larger.

Figure 8:
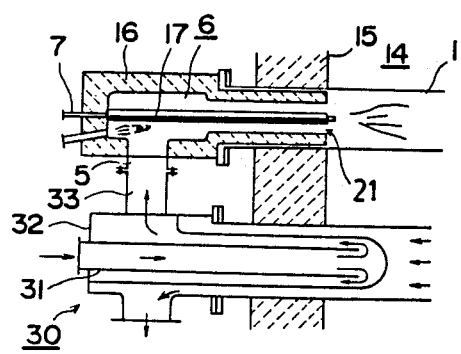
FIG. 8 illustrates an alternate embodiment of the present invention.
Figure 9:
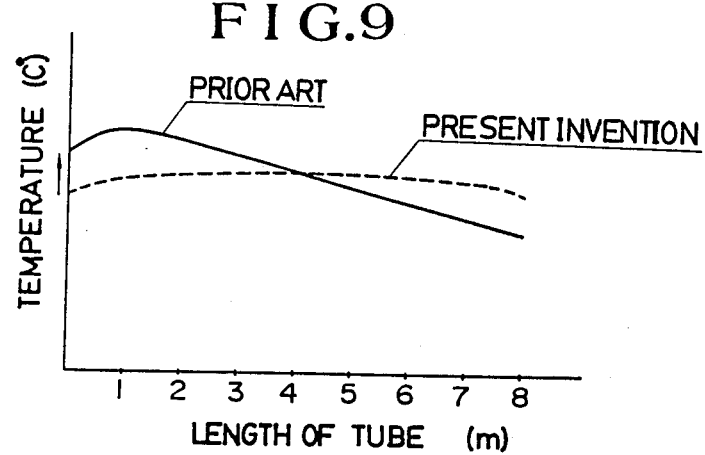
FIG. 9 is a graphic illustration of temperature distribution along a radiant tube in axis direction.
Figure 10:
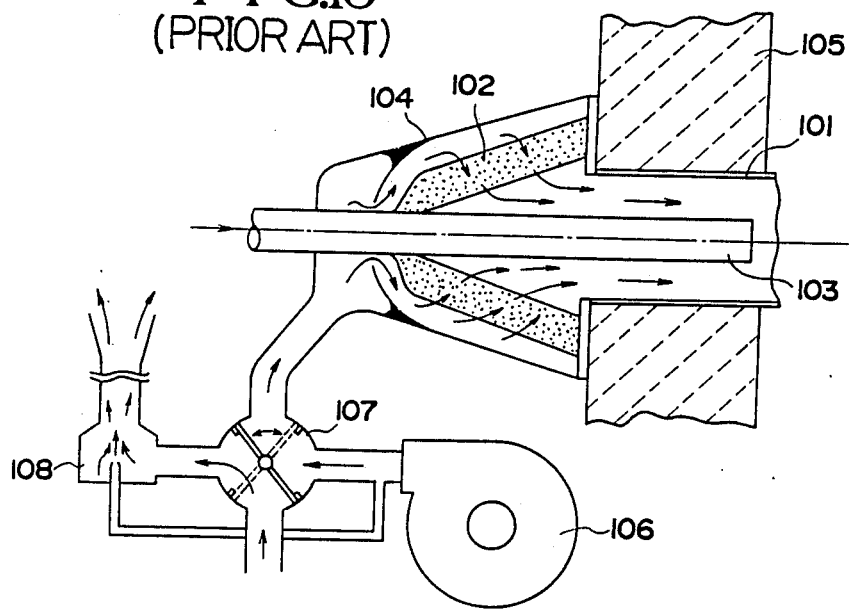
FIG. 10 illustrates an example of a radiant tube burner incorporating prior art (U.S. Pat. No. 4,604,051).

FIG. 8 illustrates a radiant tube burner with another embodiment of the recuperator of the present invention. In this configuration, a radiant tube 1 is equipped with a burner 3 at one end and a recuperator 30 at another end which preheats the combustion air using the exhaust combustion gas. The temperature of the combustion gas in the radiant tube burner commonly is about 1,000° C. When the exhaust heat of combustion gas is recovered in the recuperator 30, the exhaust temperature may be decreased to about 500° C. and the combustion air may be preheated to between about 350° and 450° C.

The recuperator 30 is constructed, for example, with double wall tubings inserted into the radiant tube 1. When the combustion air is introduced into the inner tube 31 it is transferred to the outer tube 32 through the open top end of the inner tube 31. Heat exchange then takes place between the combustion air in tube 32, and the combustion gas which flows in the radiant tube 1 around the tube 32. The outer tube 32 of the recuperator 30 is connected by a connecting tube 33 to the combustion air supply duct 5 of the burner 3 located on the opposite side for supplying the preheated combustion air. In this embodiment illustrated in the figure, the burner 3 has the secondary fuel nozzle 7 which is placed on the axis of the primary combustion chamber 6, but it is not limited by the position of the nozzle and it is possible to have secondary fuel nozzles 7 which are embedded into the castable refractory 16 form the primary combustion chamber 6 (see FIG. 7). In this case, the thermal efficiency becomes high since the combustion exhaust gas from the other end is used to preheat the combustion air.

Further more, there is a case that the radiant tube burner in this invention does not recover heat using the regenerative bed 2 or the recuperator 30 (not shown). In this case the thermal efficiency is reduced, but, NOx emissions are lower in comparison to the prior art of constructing radiant tube burners.

What is claimed is:

1. A radiant tube burner comprised of:
   a primary combustion chamber which is placed outside of a furnace and of which a combustion gas injection outlet is located approximately more inside of the furnace than the bung of a radiant tube;
   a primary fuel nozzle which injects a primary fuel into said primary combustion chamber to create a primary combustion; and
   a secondary fuel nozzle surrounded with refractory materials which injects secondaryfuel into said radiant tube from the area adjacent to said combustion gas injection outlet, wherein the primary combustion is created by supplying said primary fuel and about a total amount of combustion air for the burner into said primary combustion chamber to generate primary combustion gas, and the secondary combustion is created in said radiant tube by supplying said secoondary fuel to the generated primary combustion gas having a low concentration of oxygen.

2. A radiant tube burner according to claim 1, wherein the amount ratio of said primary fuel to whole fuel is in a range of about 5 to about 50%, and the amount ratio of said secondary fuel to whole fuel is in the range of about 95 to about 50%.

3. A radiant tube burner according to claim 1, wherein the amount ratio of said primary fuel to whole fuel is about 20%, and the amount ratio of said secondary fuel to whole fuel is about 80%.

4. A radiant tube burner according to claim 1, wherein said secondary fuel nozzle is located on the axis of said primary combustion chamber and surrounded with said refractory material.

5. A radiant tube burner according to claim 4, wherein said secondary nozzle is protruded from said injection outlet of said primary combustion chamber.

6. A radiant tube burner according to claim 4, wherein said secondary fuel nozzle injects said secondary fuel in both axial direction and radial direction of said radiant tube.

7. A radiant tube burner according to claim 6, wherein said secondary fuel nozzle injects about 5~50% of said secondary fuel to radial direction of said radiant tube and about 50~95% of said secondary fuel to axial direction of said radiant tube.

8. A radiant tube burner according to claim 6, wherein said secondary fuel nozzle injects about 40% of said secondary fuel to radial direction and about 60% of said secondary fuel to axial direction.

9. A radiant tube burner according to claim 1, including a plurality of said secondary fuel nozzles embedded inside of the wall of said primary combustion chamber and said refractory material forms the wall of said combustion chamber, so that said secondary fuel is injected about the periphery of said primary combustion gas injection outlet.

10. A radiant tube burner according to claim 1, wherein said burner is attached at one end and a recuperater at the opposite end of said radiant tube in order to take use of said exhaust combustion gas for supplying preheated combustion air.

* * * * *